United States Patent
Lenaerts (10) Patent No.: US 8,902,772 B2
(45) Date of Patent: Dec. 2, 2014

(54) ANTENNA DIVERSITY FOR MAGNETIC INDUCTION RADIO

(75) Inventor: Ludo Albert Lenaerts, Hasselt (BE)

(73) Assignee: NXP, B.V., Eindhoven (NL)

( * ) Notice: Subject to any disclaimer, the term of this patent is extended or adjusted under 35 U.S.C. 154(b) by 211 days.

(21) Appl. No.: 13/273,136

(22) Filed: Oct. 13, 2011

(65) Prior Publication Data

US 2012/0269076 A1    Oct. 25, 2012

(30) Foreign Application Priority Data

Oct. 14, 2010  (EP) ..................................... 10187547

(51) Int. Cl.
*H04L 1/06* (2006.01)
*H04B 7/06* (2006.01)
*H01Q 21/28* (2006.01)
*H04B 5/06* (2006.01)
*H04B 5/00* (2006.01)

(52) U.S. Cl.
CPC ............ *H04B 5/0006* (2013.01); *H04B 7/0615* (2013.01); *H01Q 21/28* (2013.01); *H04B 7/0608* (2013.01); *H04B 5/06* (2013.01)
USPC ........... 370/252; 370/310; 455/500; 455/504; 702/66

(58) Field of Classification Search
USPC ............................. 370/352; 455/500; 702/66
See application file for complete search history.

(56) References Cited

U.S. PATENT DOCUMENTS

| | | | |
|---|---|---|---|
| 5,721,783 | A | 2/1998 | Anderson |
| 7,610,024 | B2 | 10/2009 | Laroia et al. |
| 2002/0163904 | A1* | 11/2002 | Rao et al. ....................... 370/347 |
| 2003/0174671 | A1* | 9/2003 | Chen .............................. 370/329 |
| 2008/0113692 | A1* | 5/2008 | Zhao et al. ..................... 455/574 |
| 2010/0054512 | A1* | 3/2010 | Solum ........................... 381/315 |

FOREIGN PATENT DOCUMENTS

| | | |
|---|---|---|
| WO | 98/44591 | 10/1998 |
| WO | 2006074655 A1 | 7/2006 |
| WO | WO 2011/007210 * | 7/2009 |

OTHER PUBLICATIONS

Extended Search Report for Patent Appln. No. 10187547.4 (Mar. 17, 2011).

* cited by examiner

*Primary Examiner* — Dang Ton
*Assistant Examiner* — Mewale Ambaye

(57) ABSTRACT

A magnetic induction system is disclosed, which has antenna diversity at the transmitter side, but which does not require a bidirectional link to pass information regarding received signal quality back to the transmitter. The system uses a time division multiplexing access (TDMA) arrangement, to transmit the same, or correlated, information with a level of redundancy, from two, or more, antenna to at least a receiver. The or each receiver is configured to determine a received signal quality from the channel received from one antenna, and, in response to inadequate signal quality, to switch to another antenna.

A receiver, and a transmitter for such a magnetic induction system are also disclosed, as is an associated method.

A non-limiting application of such a system is in binaural hearing aids, in which antenna diversity is preferred at the transmitter because of space limitations.

17 Claims, 5 Drawing Sheets

ANTENNA DIVERSITY FOR MAGNETIC INDUCTION RADIO

CROSS-REFERENCE TO RELATED APPLICATIONS

This application claims the priority under 35 U.S.C. §119 of European patent application no. 10187547.4, filed on Oct. 14, 2010, the contents of which are incorporated by reference herein.

FIELD OF THE INVENTION

The present invention relates to magnetic induction transmission systems. It further relates to receivers and transmitters for such systems, and to a method of providing a magnetic induction transmission.

BACKGROUND OF THE INVENTION

For short-range wireless communication, that is to say for ranges of the order of a few centimeters up to a few meters, typically around 10 cm to around 5 m, magnetic induction transmission is an attractive option. Rather than relying on an aerial to transmit an electromagnetic wave as occurs in conventional radio (which shall also be referred to hereinafter as "RF radio") transmission, in magnetic induction transmission, a transmitter is provided with an antenna and propagates a magnetic field. The antenna is typically a coil. The receiver has as an antenna a further magnetic coil. The transmitter and receiver magnetic coils form a magnetic induction circuit, with the interlying air acting as the core. The arrangement is in some ways analogous to a conventional transformer, except to that the primary and secondary coils (transmitter and receiver antennae respectively) are not necessarily in a geometrically fixed relationship, and instead of a ferroelectric core between them, the core is air.

Figure 1:
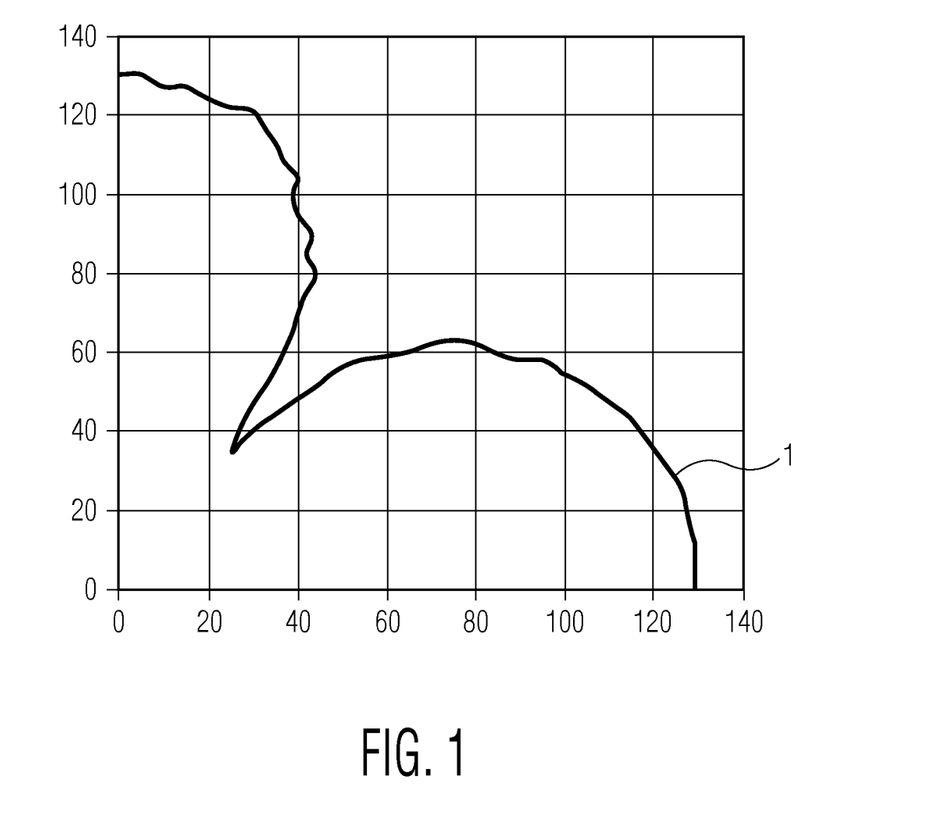
FIG. 1 illustrates nulls in the signal strength at the receiver.

The coupling between the transmitter and receiver coils, and thus the strength of the received signal for a fixed power transmitted signal, depends on both the distance between the transmitter and receiver, and their relative orientation. FIG. 1 is a radial plot, showing the relative range 1 of a signal, against the angle between the transmitter and receiver coils. On the abscissa (x-axis) is shown the range when the coils are co-axial, and on the ordinate (y-axis) is shown the range, in centimeters, when the coils are co-planar.

From the figure is clear that there is a "null spot", close to a 45° orientation between the coils. In passing, it is noted that RF radio signals suffer from similar geometrical null spots; however RF radio also suffers from fading, which generally over-rules the effect of nulls in the radiation pattern for most wireless radio applications. Fading is generally not a problem for magnetic induction radio, since the range is relatively short.

If the receiver is situated in the null spot, the received signal strength will be significantly weaker than elsewhere. For an application such as hearing aid support, in which the relative spatial arrangement between the transmitter and receiver is not known a priori, this can be a significant problem.

It is known to solve this problem by use of a technique called antenna diversity. Typically, antenna diversity is applied at the receiver side: instead of relying on a single coil, the receiver has two or more coils, arranged typically orthogonally to each other. The receiver can then switch between the multiple antennae, based on the quality of the received signal.

An alternative solution of relying on antenna diversity is known where the diversity is applied at the transmitter: in situations where there is a bidirectional link, information on the received signal quality can be returned to the transmitter, and the transmitter can then choose between which antenna to use, based on the information about the received signal quality.

Neither of these the solutions are ideal: in the case of transmitter diversity there is a requirement for a bidirectional link, which may not always be present; in the case of receiver antenna diversity, additional space to accommodate the multiple coils is required in the receiver, whereas replications which are severely space constrain, such as, for example in ear hearing aids, the additional space may not necessarily be available.

It would therefore be desirable to provide an alternative solution to the problem of nulls-spots, which does not suffer from the above limitations to the same extent.

SUMMARY OF THE INVENTION

According to a first aspect of the invention, there is provided a receiver for a magnetic induction transmission system and comprising: an antenna for receiving a signal having at least a first part and a second part as a received first part and a received second part; and a processor configured to process the received first part and to determine a first error rate from the received first part; the processor being further configured to, in response to the first error rate not exceeding an error threshold, output the processed first part, and in response to the first error rate exceeding the error threshold, process the received second part, determine a second error rate from the received second part, and output the respective one of the processed first part and the processed second part corresponding to the lower of the first and second error rate. Thereby, a magnetic induction transmission system is enabled, which uses antenna diversity at the transmitter side, rather than at the received side, but which does not require a bidirectional link to pass information back to the transmitter from the receiver.

In embodiments, the receiver further comprises an output and is further configured to, in response to the first error rate exceeding both the error threshold and the second error rate, latch the processed second part to the output. Thus, the receiver may be arranged to either revert to outputting the first part immediately, or only after a delay (which may be, for instance 9 packets or sub-frames) in order to limit bouncing between channels with the associated risk of transition artefacts.

In embodiments, the signal is a time division multiple access signal, and the first part and the second part each comprise a streaming channel frame of a superframe of the time division multiple access signal.

In embodiments, either the first part comprises a left channel of a time-slice of a stereophonic signal and the second part comprises a right channel of the time-slice of the stereophonic signal, or each of the first part and the second part comprise the same time-slice of a monophonic signal.

According to a second aspect of the invention, there is provided a transmitter for a magnetic induction transmission system and comprising a first antenna and a second antenna and configured so as to, in operation, transmit a signal comprising first part and a second part, the transmitter being configured to transmit the first part from the first antenna and the second part from the second antenna, wherein the signal is a time division multiplexing access signal, and the first part and the second part each comprise a streaming channel frame of a superframe of the time division multiplexing access signal.

In embodiments, either the first part comprises a left channel of a time-slice of a stereophonic signal and the second part comprises a right channel of the time-slice of the stereophonic signal, or each of the first part and the second part comprise the same time-slice of a monophonic signal.

According to a further aspect of the invention, there is provided a magnetic induction transmission system comprising a transmitter and a receiver each as mentioned above.

In embodiments, the magnetic induction transmission system further comprises a second receiver, the second receiver comprising: an antenna for receiving the signal as a secondary received first part and a secondary received second part; and a processor configured to process the secondary received second part and to determine a secondary second error rate from the secondary received second part; the processor being configured to, in response to the secondary second error rate not exceeding the error threshold, output the processed secondary second part, and in response to the secondary second error rate exceeding the error threshold, process the secondary received first part, determine a secondary first error rate from the received first part, and output the respective one of the secondary processed first part and the processed secondary second part corresponding to the lower of the secondary first and secondary second error rate.

In embodiments the first and second receivers comprise respectively left and right hearing aids of a stereophonic hearing aid system.

According to a yet further aspect of the invention, there is provided a method of operating a magnetic induction transmission system having a receiver, and a transmitter comprising a plurality of antennae, the method comprising: transmitting a first part of a signal comprising first part and a second part from the first antenna; subsequently transmitting the second part from the second antennae; receiving the first part as a received first part and the second part as a received second part; processing the received first part and to determine a first error rate from the received first part; outputting the processed first part in response to the first error rate not exceeding an error threshold; and, in response to the first error rate exceeding the error threshold, processing the received second part, determining a second error rate from the received second part, and outputting the respective one of the processed first part and the processed second part corresponding to the lower of the first and second error rate.

In embodiments the method further comprises, in response to the first error rate exceeding both the error threshold and the second error rate, latching the processed second part to the output.

In embodiments the signal is a time division multiple access signal, the first part and the second part each comprise a streaming channel frame of a superframe of the time division multiple access signal, and the latching lasts a predetermined number of streaming channel frames.

In embodiments, the first and second error rates are each determined as an average over a predetermined number of streaming channel frames.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which
FIG. 2 illustrates the magnetic induction transmission system according to an embodiment of the invention, at FIG. 2(a) operating in a first state; at FIG. 2(b) operating in a second state, and at FIG. 2(c) operating in a third state.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

As already discussed, for short-range magnetic induction radio, the signal strength at the receiver can be influenced by changing the radiation pattern of the transmitter. This can be done for instance by using multiple antennae, which are either physically spaced apart or have a different orientation or both. The transmitter transmits by means of this antenna constellation. The antennae produce different radio patterns with different positioning of the nulls in the signal strength pattern.

In the case that the antennae transmit the same information, the receiver can the switch between the transmitters based on reception quality, and still receive the information. Thus, if the first transmitter transmits a first channel, and the information provided on this channel is the same as that provided by the second transmitter transmitting a second channel, then there is the level of redundancy, and irrespective of which channel the receiver uses, it still receive the same information. Even if the antennae do not transmit the same information, the information may be correlated. An example is the left and right signals of a stereophonic signal. In normal transmission, the first antenna transmits, say, the left signal, and the second antenna transmits the other signal (the right signal). A receiver would normally be configured to process only one of these signals, say the left signal as a concrete example; however, if the received signal quality is insufficient, the receiver may be reconfigured to process the other signal, which is the right signal in this concrete example. Although in this case there would still be some loss of signal (that is, in the example, the left signal) there may be circumstances where it is preferable to receive an adequate strength right signal rather than the inadequate strength left signal.

Figure 2A:
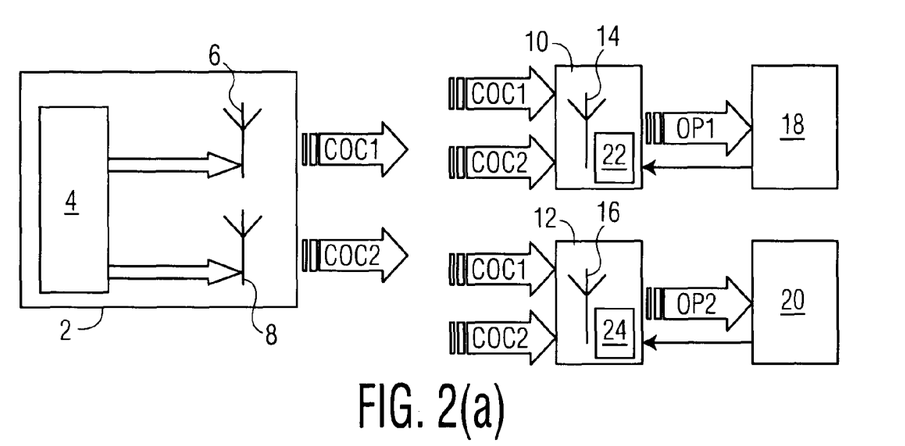

FIG. 2 illustrates the magnet induction transmission system according to an embodiment of the invention. At FIG. 2(a), the magnetic induction transmission system is shown operating in a first, normal, state. The system comprises the transmitter 2, which may have associated with it signal processor 4 for producing separate signals to each of two antennae, 6 and 8 as shown. Processor 4 typically compresses audio samples, and arranges them for transmission by antennae 6 and 8. First antenna 6 transmits a first logical channel COC1. The contents of the logical channel will be described in more detail hereinbelow. Second antenna 8 transmits a second logical channel COC2.

The system has at least a receiver, and as shown may comprise two receivers 10 and 12 respectively. Each receiver includes an antenna, 14 and 16 respectively, and a processor 22 and 24 respectively. Each receiver outputs an output OP1 and OP2 respectively, to an output device 18 and 20 respectively, which may be for instance a hearing aid speaker.

As will be described in more detail hereinbelow, the two antennae 6 and 8 transmit alternatively, the first antenna 6 transmitting information in a first logical channel, COC1, and the second antenna 8 transmitting information in a second logical channel, COC2.

The first logical channel COC1 may comprise the left signal of a stereophonic signal, whereas the second logical channel COC2 may comprise the right signal of the stereophonic signal. In other embodiments, first and second logical channels COC1 and COC2 each carry the whole of a monophonic signal. In this latter example, there is complete redundancy between the channels COC1 and COC2.

The first receiver 10 receives a received signal which includes both COC2 and COC1. However, it normally only "listens" to the COC1 part of the received signal: the processor 22 of receiver 10 extracts the COC1 information from the appropriate time-slots of the received signal. Processor 22 further processes the COC1 information, for instance by decompressing received audio samples. The decompressed audio sample is output as OP1 to output device 18, such as a hearing aid speaker.

Similarly, the second receiver 12 receives a received signal which includes both COC2 and COC1. However, it normally only "listens" to the COC2 part of the received signal: the processor 24 of receiver 12 extracts the COC2 information from the relevant time-slots of the received signal. Processor 24 further processes the COC2 information, for instance by decompressing received audio samples. The decompressed audio sample is output as OP2 to output device 20, such as a hearing aid speaker.

Figure 2B:
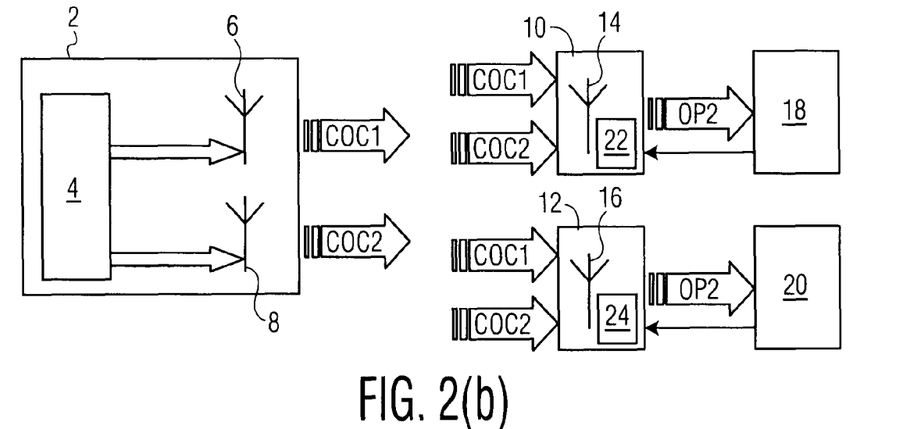

With regard to first receiver 10, in addition to the decompression, processor 22 determines an error rate PER1, as will be discussed further hereinbelow. If the error rate PER1 exceeds a certain threshold t1, the receiver starts to "listen" to the COC2 part of the received signal. In this case, the processor 22 may decompress the COC2 information, to produce a further decompressed audio sample, and derives a second error rate PER2. (The skilled person will appreciate that in some embodiments, in particular when the COC1 and COC2 channel both contain the same sample of a monophonic audio signal, such further decompression may not be necessary—for instance, it may be possible to determine the second error rate PER2 without having to decompress the signal.) Since the part of the received signal comprising COC2 has been received from a different antenna compared with the part of the received signal comprising COC1 (that is to say, antenna 8 rather than antenna 6), the signal strength or quality of this part of the signal may be different to that comprising COC1. Processor 22 thus compares the error rate PER2 with the error rate PER1. If it determines that the second part of the signal, comprising COC2, has a higher quality than the first part of the signal, that is to say if PER2<PER1, processor 22 directs the decompressed signal from COC2, rather than the decompressed signal from COC1, to output device 18 as shown in FIG. 2(*b*).

As will be seen from FIG. 2(*b*), output device 18 associated with first receiver 10 and output device 20 associated with second receiver 12 now receive the same output signal OP2. In the case of a monophonic signal, OP2 is the same as OP1, and thus there is no loss of information; in the case of a stereophonic signal, the situation corresponds to both left and right output devices receiving the same (either left or right) signal of the stereophonic signal.

In the case at least of a stereophonic signal, it is not ideal that the same channel is received by both receivers; the receiver thus preferably reverts back to the original situation as soon as is practicable. In one embodiment this is achieved by processor 22 continuing to monitor both PER1 and PER2, once it has switched its output to OP2. If either the signal quality of the first part of the received signal improves such that the condition no longer holds that its error rate is higher than the threshold (that is to say, it is no longer true that PER1>t1), or the relative qualities of the two signals change such that it is no longer true that PER2<PER1, then the processor 22 reverts to the normal situation, and outputs OP1 to the device 18. It will be appreciated that it may be beneficial to introduce some hysteresis to prevent rapid bouncing between the two states, which could be disorienting to a user. In other embodiments, processor 22 only periodically, rather than continuously, checks the relative signal qualities, to determine whether the output from processor to 22 should revert to OP1. Depending on the type of information transmits, different modes of reverting to the original configuration may be preferred: for instance, for a monophonic signal, it may be preferred that the first receiver 10 switches back to OP1 immediately that the signal quality of a single sub-frame (which may correspond to a single packet of information), is higher in COC1; in stereophonic it may be preferable to delay the switch back either by a fixed delay, or until an average signal quality over a plurality of subframes, for example 9 sub-frames, is higher for COC1 than COC2.

$$\left(\text{That is to say:} \sum_{n=1}^{9} PER1_n < \sum_{n=1}^{9} PER2_n\right)$$

Whilst the above discussion has focused on receiver 10, it will be immediately apparent to the skilled person that the second processor 24 which forms part of second receiver 12 may carry out an analogous function with regard to the received signal. Second processor 24 may thus switch the output of second receiver 12 to the audio sample, corresponding to COC1, that is to say, to OP1.

Figure 2C:
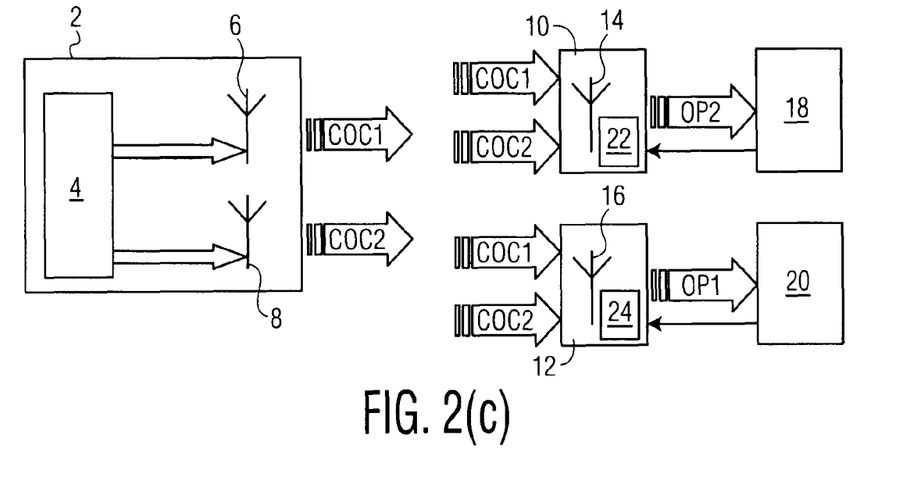

Since receivers 10 and 12 occupy different positions, it is possible that first receiver 10 receives a better quality signal from a second antenna 8 than from the first antenna 6 at the same time that the second receiver 12 receives a high quality signal from the first antenna 6 than from second antenna 8. It may thus be the case that both receivers 10 and 12 switch their output; this situation is shown in FIG. 2(*c*), which is similar to FIG. 2(*a*) except that receiver 10 outputs OP2 corresponding to the second part COC2 of the received signal, and receiver 12 outputs the output OP1 corresponding to the first part COC1 of the received signal. In terms of any user experience for a stereophonic transmission to binaural hearing aids, this corresponds to the user hearing the left channel in the right ear and the right channel in the left ear.

As discussed above, the processor 4 in the transmitter processes the input signal by for instance compressing audio samples, and directing information in a first logical channel COC1 to first antenna 6, and information in a second logical channel COC2 to first antenna 8; the antennae then broadcast alternately. This corresponds to a time division multiplexing access (TDMA) scenario in its broadest sense.

Figure 3:
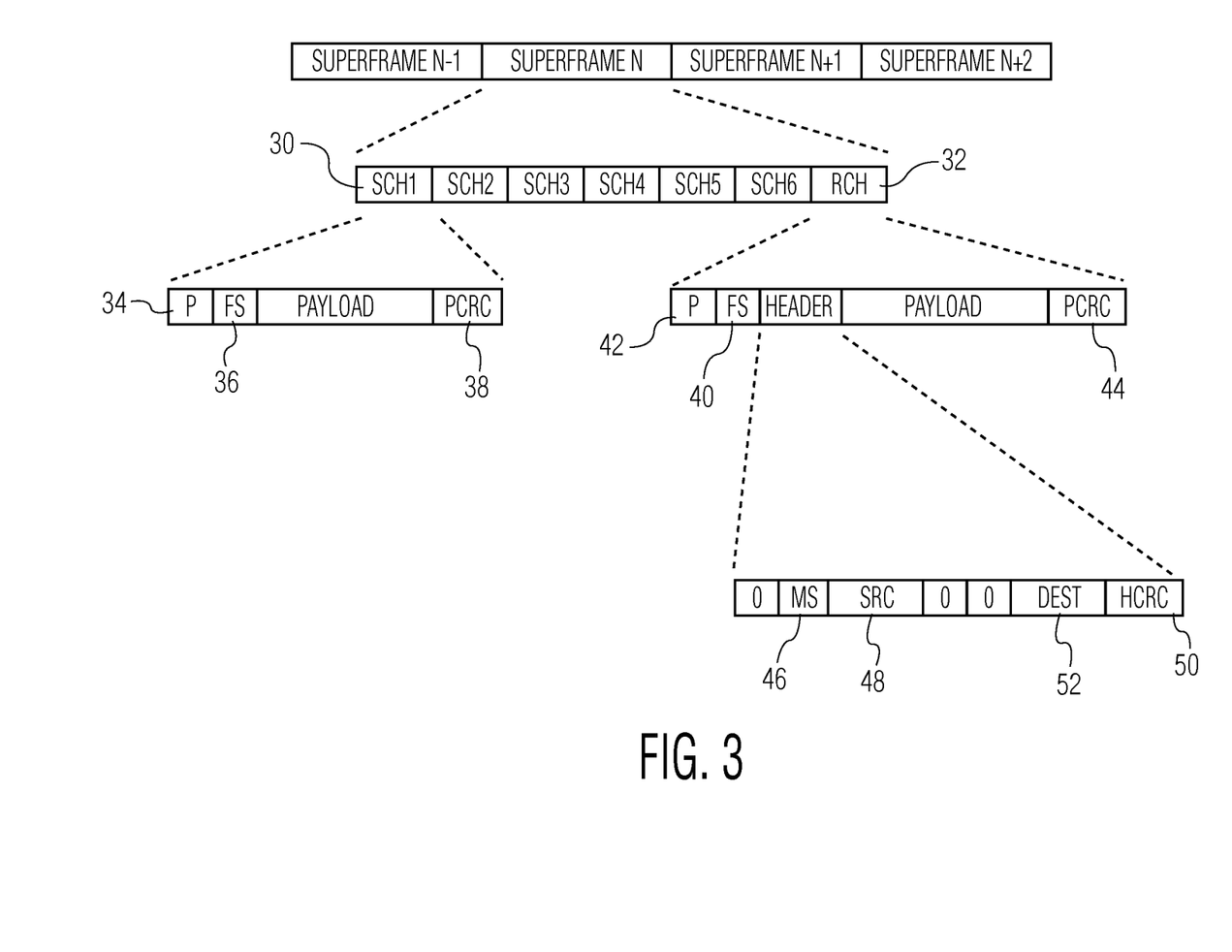
FIG. 3 shows a super-frame data layout according to a TDMA schedule.

The invention is not limited to any specific time division multiplexing access (TDMA) configuration; however, FIG. 3 shows a super-frame data layout according to an exemplary TDMA schedule. A superframe is 1236 bits long, and at a transmission rate of 298 kbps the duration of the superframe is 4.14 ms.

The superframe is subdivided into 7 TDMA slots called subframes. Depending on the location in the superframe, a subframe is part of a streaming channel (SCH) 30 or a random channel (RCH) 32. There are six streaming channels followed by one random channel. In between each subframe there is an inter-frame gap, shown at 56 on FIG. 4, to account for the time required for receive/transmit (RX/TX) switching, propagation delay, and clock mismatches between devices. Each streaming channel 30 comprises a preamble (P) 34 followed by a frame synchronization word (FS) 36, followed by a payload, and concludes with a payload cyclic redundancy check (PCRC) 38. The payload cyclic redundancy check is implemented by means of a Reed-Solomon forward error detection and correction (RS-FEC). As will be immediately apparent to the skilled person, from this RS-FEC it is possible to determine a packet error rate (PER) associated with the streaming channel, as mentioned above. In other embodiments, it is possible to simply count the number of corrected samples or sub-frames, to determine the packet error rate. In embodiments of the invention determination of, respectively, PER1 or PER2 is carried out by receiver processor 22 or 24 from the RS-FEC data.

Although not critical for present purposes, it is noted that the random channel 32 has broadly the same configuration as the streaming channel 30 (that is to say, it has a preamble followed by a stream of synchronization word followed by a payload and payload cyclic redundancy check). However, in the case of a random channel, the payload is preceded by a header; this header includes a MAC signaling 46, source network address (SRC) 48, a destination network address (Dest) 52, and a header CLC (HCRC) 50.

The random channel is used to transmit generally short control data messages. It is thus not used in the antenna diversity at the transmitter: that is to say, the RCH channel is transmitted from one or other of the antennae, based on a predetermined arrangement. Thus, in some embodiments, the RCH channel is always transmitted from the first antenna; in other embodiments, the channel is transmitted alternately from the first and second antenna in consecutive superframes; in other embodiments, any information in the channel is transmitted twice—first from the first antenna, and then, in the immediately subsequent sub-frame, from the second antenna. Such an arrangement can allow for antenna diversity for the control data, similar to that disclosed herein for the—typically audio—data antenna diversity. In other circumstances, where multiple signal paths are not a problem, the channel may be transmitted from both antennae simultaneously; however, since transmitting from both antennae is perceived as transmitting from one virtual antenna, this typically is not particularly advantageous.

Figure 4:
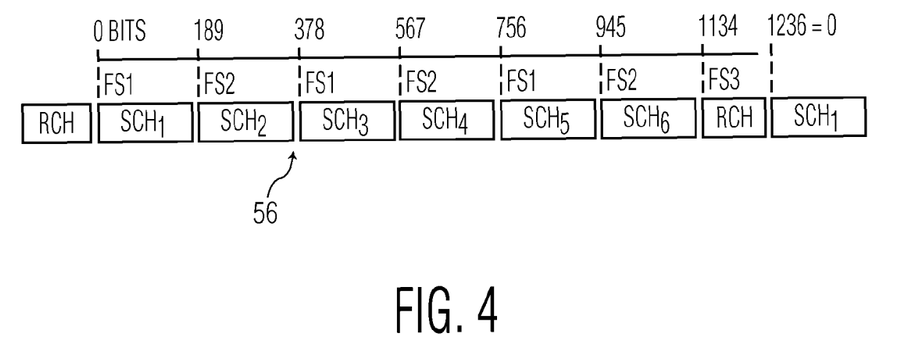
FIG. 4 shows an overview of TDMA slots.

FIG. 4 shows the configuration of a single superframe. As already indicated, the superframe comprises 6 signal channels ($SCH_1$, $SCH_2$ . . . $SCH_6$) followed by a random channel (RHC). Each of the channels is followed by an interframe gap 56; the length of each signal channel plus the interframe gap is 189 bits, whilst the length of the random channel plus its interframe gap is 112 bits: at a transmission rate of 298 kbps, this corresponds to a total superframe time of 4.14 ms.

Figure 5:
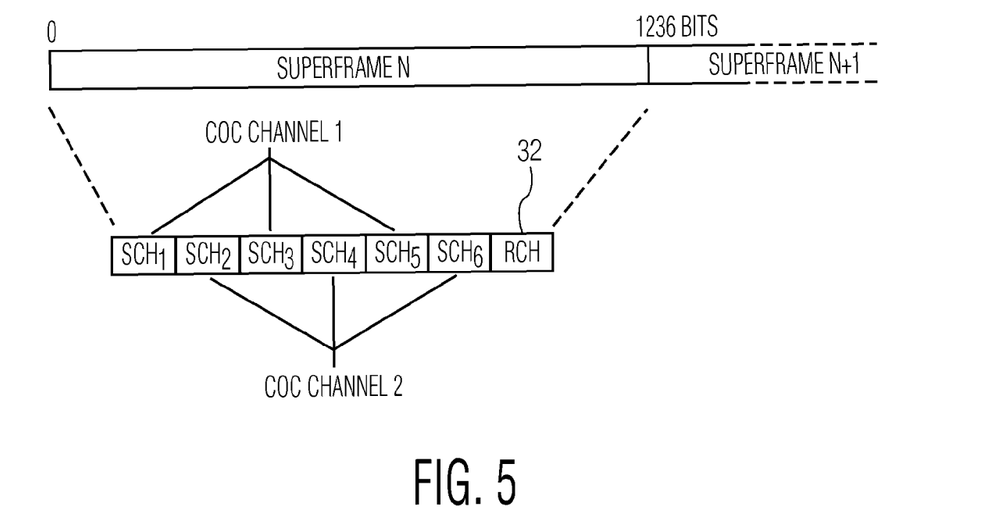
FIG. 5 shows the mapping of a TDMA structure onto logical channels according to an embodiment of the invention.

According to embodiments of the invention, and as shown in FIG. 5, the two logical channels (which may also be called connection-orientated channels) COC1 and COC2 are constructed from the signal channel subframes, with alternate subframes being allocated to opposite logical channels. Thus, $SCH_1$, $SCH_3$ and $SCH_5$ are allocated to the first logical channel COC1, whereas $SCH_2$, $SCH_4$ and $SCH_6$ are allocated to the second logical channel COC2. The random Channel 32 (RCH) associated with each subframe is not allocated to either logical channel (it is conventionally used for one connectionless channel). In the case of a monophonic signal, COC1 and COC2 may carry the same information corresponding to the same compressed audio sample; in the case of the stereophonic signal, COC1 and COC2 may carry a compressed version of the left signal and right signal respectively of the audio sample.

Thus in the case of a monophonic signal, there is complete redundancy between the logical channels COC1 and COC2; if one channel is not available, the same information can be retrieved from the other channel. In the case of a stereophonic signal, the logical channels do not carry the same information but they carry closely correlated information corresponding to the left and right signals from the same audio sample.

Figure 6A:
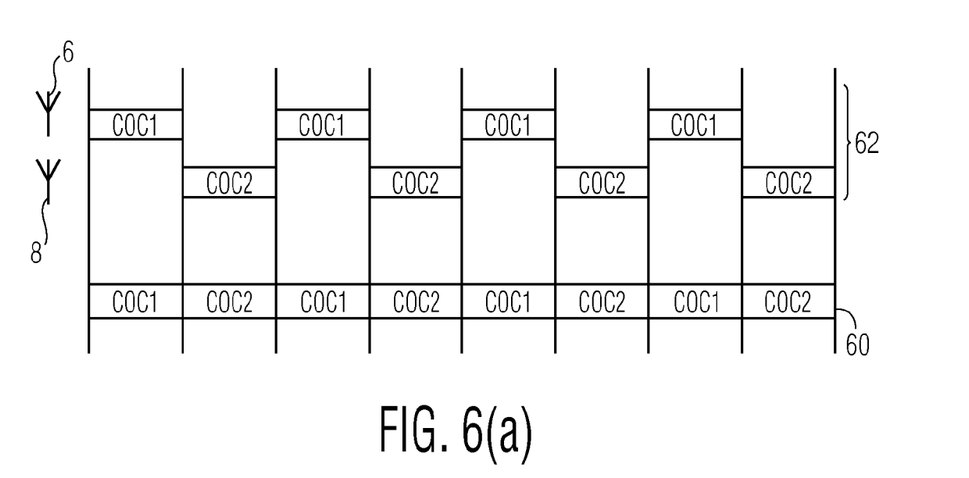
FIG. 6 illustrates a transmission method according to an embodiment of the invention.
Figure 6B:
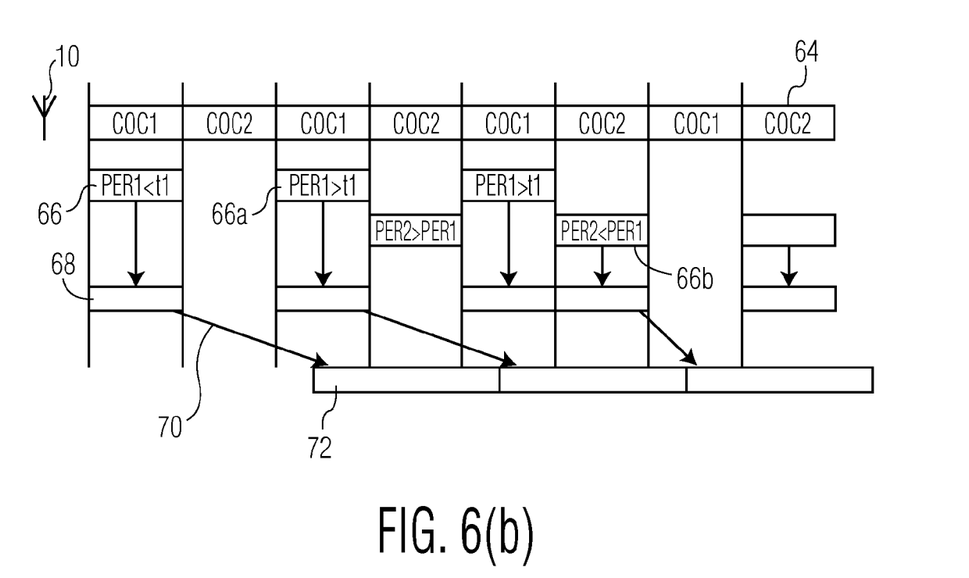

Turning now to FIG. 6, this shows at FIG. 6(*a*) the data transmission on the transmitter side of a magnet induction transmission system according to embodiments of the invention, and at FIG. 6(*b*), the data reception and decompression at the receiver side (for a single receiver) of a magnetic induction transmission system according to embodiments of the invention.

At 60 is shown the output from the transmitter processor 4, against time on the x-axis. Above this are shown at 62 the alternating transmissions of COC1 and COC2 by first and second antenna 6 and 8 respectively.

At the lower part of the FIG. 6(*b*), it is shown at 64 that the antenna 10 of the first receiver 14 receives all of the transmitted information (COC1 and COC2). Receiver 14 processes the information corresponding to the first logical channel (COC1), and once the complete packet has been received and provided that its error rate is sufficiently low (that is to say, PER1<t1), decompresses the information, as shown at 68, and passes it (as shown by arrow 70) to form a part of a continuous output stream 72 on the output device 18. If, as shown at 66*a* for the second timeslot of logical channel COC1, its error rate is higher than the threshold error rate (PER1>t1), then the receiver starts to "listen" to the second logical channel, by processing the information in the relevant time-slot. Provided the error rate of the second logical channel is higher than that of the first logical channel, the processor 22 may continue to decompress the first logical channel information and pass it to the continuous output stream 72; however, if the processor 22 determines that the error rate of the second logical channel is lower than that of the first logical channel (PER2<PER1), as shown at 66*b*, the processor switches and decompresses the information on the second logical channel and directs this to the continuous output stream 72.

As discussed above, in embodiments, it is convenient to decompress only the logical channel information which is to be passed to the output, since this minimizes the power consumption; however, in other embodiments, both channels are decompressed, since this allows simple processing and can help to avoid artifacts arising from the transition of the output from one logical channel to the other logical channel.

It will be appreciated that although the reception at 64, error rate evaluation at 66, and decompression at 68 are shown as being carried out in same timeslot, without any off-set being shown, this is schematic only, and in any practical embodiment, there will be some time offset, since each of the processes requires a finite amount of time. Although in general, this offset it may not be significant, in embodiments the audio sample is decompressed after the full packet has been received, and the decompression itself is spread over almost a packet time for power current shaping. However, the time offset before the decompressed signal is passed to form a part of the continuous output stream 72 is shown, since a sufficient latency is required so that the decompressed information from either logical channel (COC1 or COC2) may be used to fill the same timeslot in the uncompressed continuous data output stream 72.

From one viewpoint, then there is disclosed herein a magnetic induction system is disclosed, which has antenna diversity at the transmitter side, but which does not require a bidirectional link to pass information regarding received signal quality back to the transmitter. The system uses a time division multiplexing access (TDMA) arrangement, to transmit the same, or correlated, information with a level of redundancy, from two, or more, antenna to at least a receiver. The or each receiver is configured to determine a received signal quality from the channel received from one antenna, and, in response to inadequate signal quality, to switch to another antenna. A receiver, and a transmitter for such a magnetic induction system are also disclosed, as is an associated method. A non-limiting application of such a system is in binaural hearing aids, in which antenna diversity is preferred at the transmitter because of space limitations.

From reading the present disclosure, other variations and modifications will be apparent to the skilled person. Such variations and modifications may involve equivalent and other features which are already known in the art of magnetic induction transmission, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and reference signs in the claims shall not be construed as limiting the scope of the claims.

The invention claimed is:

1. A receiver for a magnetic induction transmission system comprising: an antenna for receiving a signal having at least a first part and a second part as a received first part and a received second part; and a processor configured to process the received first part and to determine a first error rate from the received first part; the processor being further configured to, in response to the first error rate not exceeding an error threshold, output the processed first part without processing the second part and without determining a second error rate from the second part, and in response to the first error rate exceeding the error threshold, process the received second part, determine a second error rate from the received second part, and output the respective one of the processed first part and the processed second part corresponding to the lower of the first and second error rate; wherein the signal is a time division multiple access signal, and the first part and the second part each comprise a streaming channel frame of a superframe of the time division multiple access signal.

2. A receiver according to claim 1, further comprising an output and further configured to, in response to the first error rate exceeding both the error threshold and the second error rate, latch the processed second part to the output.

3. A receiver according to claim 1, wherein either the first part comprises a left channel of a time-slice of a stereophonic signal and the second part comprises a right channel of the time-slice of the stereophonic signal, or each of the first part and the second part comprise the same time-slice of a monophonic signal.

4. A magnetic induction transmission system according to claim 1, and further comprising a second receiver, the second receiver comprising: an antenna for receiving the signal as a secondary received first part and a secondary received second part; and a processor configured to process the secondary received second part and to determine a secondary second error rate from the secondary received second part; the processor being configured to, in response to the secondary second error rate not exceeding the error threshold, output the processed secondary second part, and in response to the secondary second error rate exceeding the error threshold, process the secondary received first part, determine a secondary first error rate from the received first part, and output the respective one of the secondary processed first part and the processed secondary second part corresponding to the lower of the secondary first and secondary second error rate.

5. A magnetic induction transmission system according to claim 4, wherein the first and second receivers comprise respectively left and right hearing aids of a hearing aid system.

6. A method of operating a magnetic induction transmission system having a receiver, and a transmitter comprising a plurality of antennae, the method comprising: transmitting a first part of a signal from the first antenna, the signal comprising the first part and a second part; subsequently transmitting the second part of the signal from the second antennae; receiving the first part as a received first part and the second part as a received second part; processing the received first part and determining a first error rate from the received first part; outputting the processed first part in response to the first error rate not exceeding an error threshold without processing the received second part and without determining a second error rate from the second part; and in response to the first error rate exceeding the error threshold: processing the received second part; determining a second error rate from the received second part; and outputting the respective one of the processed first part and the processed second part corresponding to the lower of the first and second error rate; wherein the signal is a time division multiple access signal, and the first part and the second part each comprise a streaming channel frame of a superframe of the time division multiple access signal.

7. The method of claim 6, further comprising, in response to the first error rate exceeding both the error threshold and the second error rate, latching the processed second part to the output.

8. The method of claim 7, wherein the latching lasts a predetermined number of streaming channel frames.

9. The method of claim 6, wherein the first and second error rates are each determined as an average over a predetermined number of streaming channel frames.

10. The method of claim 6 further comprising continuously monitoring the first error rate if the first error rate exceeds the error threshold and reverting to outputting the processed first part if the first error rate drops below the error threshold.

11. The method of claim 6 further comprising periodically monitoring the first error rate if the first error rate exceeds the error threshold and reverting to outputting the processed first part if the first error rate drops below the error threshold.

12. A method of operating a magnetic induction transmission system having a receiver, the method comprising: receiving a first part of a signal as a received first part and a second part of the signal as a received second part; processing the received first part and determining a first error rate from the received first part; outputting the processed first part in response to the first error rate not exceeding an error threshold without processing the received second part and without determining a second error rate from the second part; and in response to the first error rate exceeding the error threshold, processing the received second part; determining a second error rate from the processed second part; and outputting the respective one of the processed first part and the processed second part corresponding to the lower of the first and second error rate; wherein the signal is a time division multiple access signal, and the first part and the second part each comprise a streaming channel frame of a superframe of the time division multiple access signal.

13. The method of claim 12, further comprising, in response to the first error rate exceeding both the error threshold and the second error rate, latching the processed second part to the output.

14. The method of claim 12, wherein the latching lasts a predetermined number of streaming channel frames.

15. The method of claim 12, wherein the first and second error rates are each determined as an average over a predetermined number of streaming channel frames.

16. The method of claim 12 further comprising continuously monitoring the first error rate if the first error rate exceeds the error threshold and reverting to outputting the processed first part if the first error rate drops below the error threshold.

17. The method of claim 12 further comprising periodically monitoring the first error rate if the first error rate exceeds the error threshold and reverting to outputting the processed first part if the first error rate drops below the error threshold.

* * * * *